United States Patent
Mahmoud et al.

(10) Patent No.: US 11,782,668 B2
(45) Date of Patent: Oct. 10, 2023

(54) ELECTROMAGNETIC BAND GAP STRUCTURES

(71) Applicant: Apple Inc., Cupertino, CA (US)

(72) Inventors: Mahmoud N. Mahmoud, Dublin, CA (US); Cheung-Wei Lam, San Jose, CA (US); Ali Foudazi, Campbell, CA (US); Le Wang, San Jose, CA (US); Qianyi Zhao, San Jose, CA (US); Kedi Zhang, Sunnyvale, CA (US); Xingchao C. Yuan, Palo Alto, CA (US); Jon F. Housour, San Francisco, CA (US); Gary Chung, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/900,680

(22) Filed: Aug. 31, 2022

(65) Prior Publication Data

US 2022/0413789 A1    Dec. 29, 2022

Related U.S. Application Data

(63) Continuation of application No. 17/480,089, filed on Sep. 20, 2021, now Pat. No. 11,561,752, which is a
(Continued)

(51) Int. Cl.
*H01Q 1/24* (2006.01)
*H01Q 13/10* (2006.01)
(Continued)

(52) U.S. Cl.
CPC ............ *G06F 3/1446* (2013.01); *G06F 3/044* (2013.01); *G06F 3/0412* (2013.01); *G06F 2203/04103* (2013.01)

(58) Field of Classification Search
None
See application file for complete search history.

(56) References Cited

U.S. PATENT DOCUMENTS 8,595,924 B2   12/2013   McKinzie, III
8,598,468 B2   12/2013   Kim et al.
(Continued)

FOREIGN PATENT DOCUMENTS

CN   102142855 A    8/2011
CN   106210180      12/2016
(Continued)

OTHER PUBLICATIONS

Korean Office Action for Korean Patent Application No. 10-2020-0110017, dated Jul. 20, 2021; 7 pgs.
(Continued)

*Primary Examiner* — Carl Adams
(74) *Attorney, Agent, or Firm* — FLETCHER YODER PC

(57) ABSTRACT

Devices for mitigating or stopping noise or surface current on a display are provided. An electronic device including a display may include a display substrate, a mid-support plate that is adjacent to the display substrate, and a lower support plate that is adjacent to the mid-support plate. A space exists between the mid-support plate and the lower support plate. The mid-support plate includes one or more electromagnetic band gap (EBG) structures formed through the mid-support plate, one or more electromagnetic band gap structures mounted onto the mid-support plate, or both. The one or more electromagnetic band gap structures may mitigate or stop surface current flow across the display.

20 Claims, 8 Drawing Sheets

Related U.S. Application Data continuation of application No. 16/585,238, filed on Sep. 27, 2019, now Pat. No. 11,262,966.

(51) Int. Cl.
*G06F 3/14* (2006.01)
*G06F 3/044* (2006.01)
*G06F 3/041* (2006.01)

(56) References Cited

U.S. PATENT DOCUMENTS

| | | | |
|---|---|---|---|
| 8,610,629 | B2 | 12/2013 | Pascolini et al. |
| 9,684,074 | B2 | 6/2017 | Schrank et al. |
| 9,929,455 | B2 | 3/2018 | Tanaka |
| 2007/0257749 | A1 | 11/2007 | Gorrell et al. |
| 2009/0096552 | A1 | 4/2009 | Hwang et al. |
| 2011/0170268 | A1 | 7/2011 | Takemura et al. |
| 2013/0272563 | A1 | 10/2013 | Boyd |
| 2014/0232607 | A1 | 8/2014 | Lee et al. |
| 2016/0006093 | A1 | 1/2016 | Tseng et al. |
| 2016/0070304 | A1 | 3/2016 | Shin et al. |
| 2016/0093939 | A1 | 3/2016 | Kim et al. |
| 2019/0058244 | A1* | 2/2019 | Kim .................. H01Q 1/243 |

FOREIGN PATENT DOCUMENTS

| | | |
|---|---|---|
| CN | 107851879 | 3/2018 |
| CN | 107925152 A | 4/2018 |
| CN | 110168804 | 8/2019 |
| EP | 3196976 | 7/2017 |
| KR | 10-20080070458 | 7/2008 |
| KR | 10-20190057568 | 5/2019 |
| WO | 2018112246 | 6/2018 |

OTHER PUBLICATIONS

K. Praveen Kumar, Passive Tunable 3D EBG Design for Beam Reconfiguration of Slotted Patch Antenna Array, May 29, 2015, pp. 1-16.

Chinese Office Action for Chinese Patent Application No. 202010856677.0 dated Nov. 1, 2021; 14 pgs.

K.P. Ray et al.; "Designing of 3-port electromagnetic band gap rectangular patch coupler"; 2008 International Conference on Recent Advances in Microwave Theory and Applications; dated 27JAN2009.

Xiao Lin Xue; "Slots Based Ultro-wideband End-fire Antenna Design and Its Conformal Array Research"; Master Dissertation submitted to University of Electronic Science and Technology of China, Apr. 2016; 93 pgs.

Xu et al.; "Research of wide-band electromagnetic scattering characteristics of slits on three-dimensional objects"; Journal of Anhui University (Natural Science Edition), vol. 34, No. 6, Nov. 2010; 4 pgs.

Notice of Allowance for Chinese Patent Application No. 202210836709X dated Jun. 15, 2023; 5 pgs.

* cited by examiner

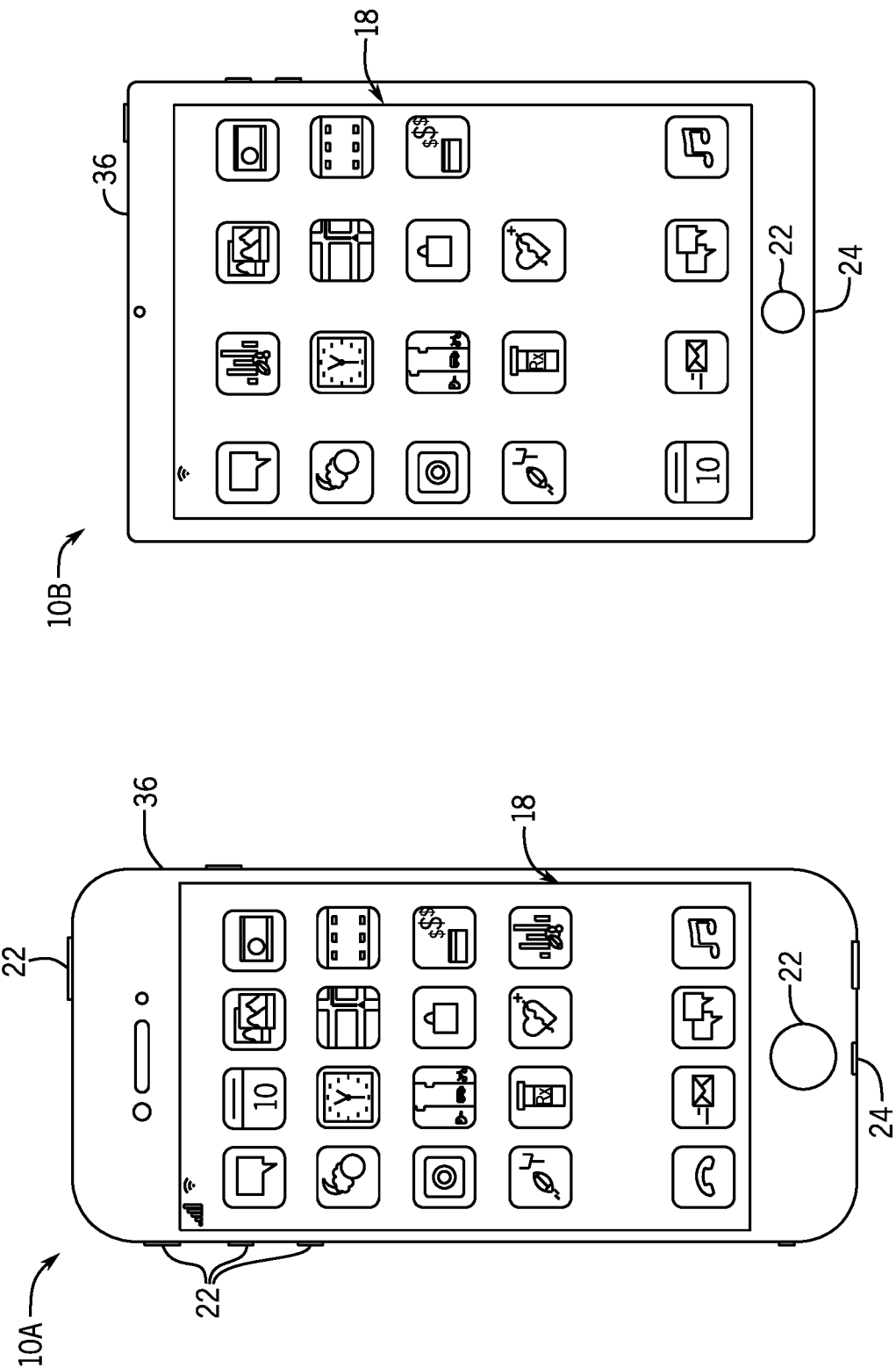

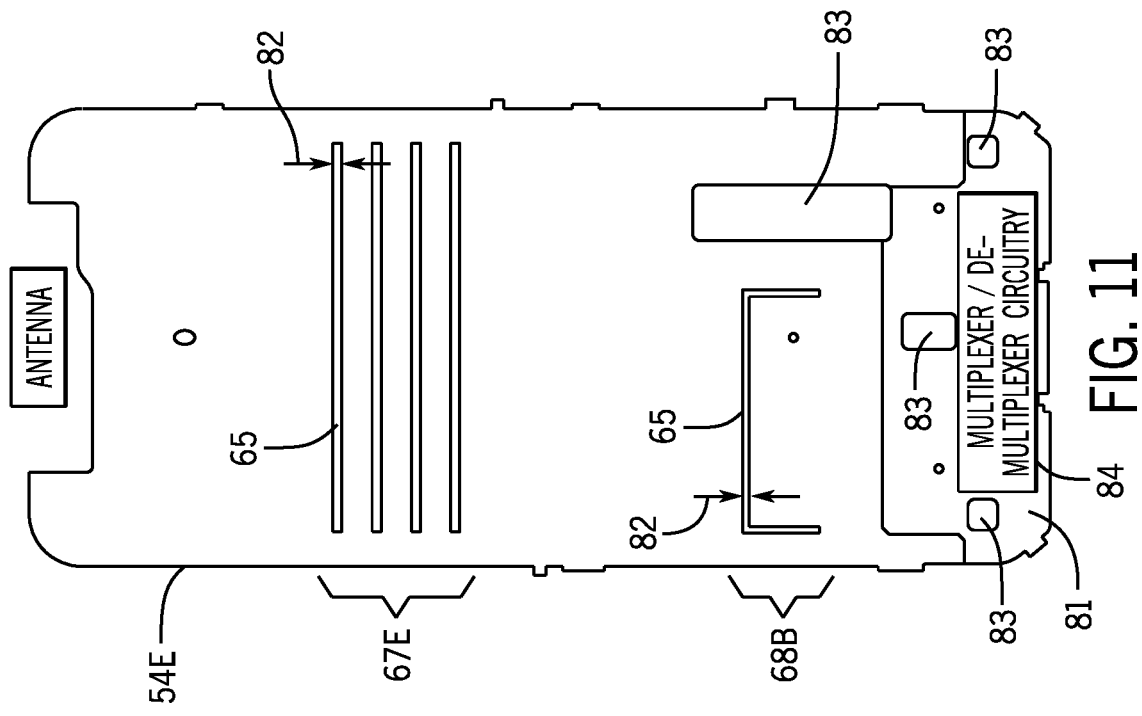
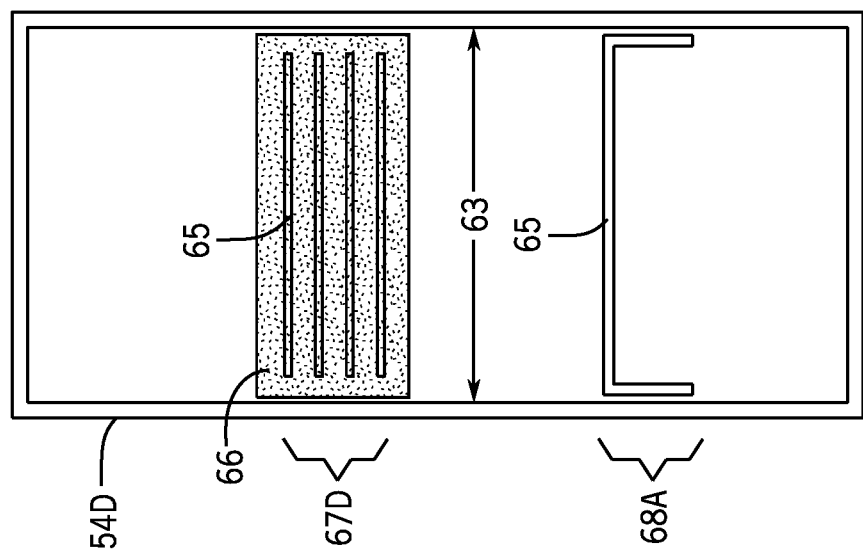

ELECTROMAGNETIC BAND GAP STRUCTURES

CROSS-REFERENCE TO RELATED APPLICATIONS

This application is a continuation of and claims priority to U.S. application Ser. No. 17/480,089, filed Sep. 20, 2021, entitled, "ELECTROMAGNETIC BAND GAP STRUCTURES," which is a continuation of and claims priority to U.S. application Ser. No. 16/585,238, filed Sep. 27, 2019, entitled, "ELECTROMAGNETIC BAND GAP STRUCTURES," now U.S. Pat. No. 11,262,966, each of which is incorporated by reference in its entirety for all purposes.

BACKGROUND

The present disclosure relates generally to wireless devices and, more particularly, to radio frequency (RF) devices that include a light emitting diode (LED) display or a liquid crystal display (LCD) with a metallic back plate in parallel with a single or multiple system metallic support plates.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as cellular phones and laptops, often include transceivers to facilitate wireless communication of data, such as by either transmitting or receiving wireless data signals, with other electronic devices. These data signals are typically communicated over a network channel on a frequency band to and from one or more wireless devices. By way of example, one electronic device may transmit data signals to another electronic device over a channel of a particular Wi-Fi frequency band (e.g., 2.4 Gigahertz (GHz) or 5 GHz) or a cellular frequency band (e.g. 0.6 GHz to 3 GHz).

Electronic devices may include an electronic display, such as a light emitting diode (LED) display, an organic light emitting diode (OLED) display, or a liquid crystal display (LCD), to present visual information. For example, an LED display includes multiple pixels, each made up of an array of LEDs. The display architecture may include a display substrate stacked on one or more metallic display plates separated by an air gap. The display plates may include material used to facilitate displaying images by the light emitted from the LEDs. Briefly, integrating the display in a device, such as by stacking the display substrate on the metallic support plate(s) in parallel, may generate a transmission line effect due to the air gap between the conductive metallic support plates. The display substrate may include display circuits, multiple data lines (e.g., thousands of data lines communicating data between components on the display plate), and a glass substrate. In some display substrates, the various metal data lines may be located close to each other, thereby forming a plate-like structure. As such, and similar to the LED parallel support plates, a transmission line effect may be created between the plate formed by the data lines and the support plate.

The "transmission line" may carry noise by allowing surface current to flow from one side of the device (e.g., on the display substrate) from a noise generator, which may be referred to as an "aggressor," to the other side of the device to a component that may be adversely effected by the noise, which may be referred to as the "victim." The noise may flow back-and-forth between the aggressor and the victim. In particular, the aggressor may include components of the device that are used for device operations not directly associated with an intended wireless communication. For example, the aggressor may generally include display multiplexer and de-multiplexer circuits, diodes, microprocessors, chips, and the like.

On the other hand, the victim may include device components that are impacted by the aggressor, such as components directly used for wireless communication operations. The victim may include one or more antennas (e.g., Long-Term Evolution (LTE) antenna, global positioning system (GPS) antenna, and/or Wi-Fi antenna), low noise amplifier (LNA), power amplifier (PA), etc. Unintended signals, voltage, or surface current causing noise may travel from the aggressor to the victim via the display architecture, thereby impacting the intended wireless communication signals. In some implementations, the aggressor may also include noise or surface current generated by a transmitted radio frequency (RF) signal. For example, the noise occurring on the same frequency band as the transmitted RF signal may couple to nonlinear display components or circuitry on the display substrate (e.g. multiplexer circuit), which may result in intermodulation of the noise. The intermodulated noise may occur on a receiver frequency band (rather than the transmitter frequency band) and may be coupled to the receiver through reflections. As such, the intermodulated noise may interfere with a victim, such as the receiver of the RF device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to mitigating or stopping noise or surface current from flowing from one portion of an electrical device to another portion of the electrical device using one or more electromagnetic band gap structures (EBGs). In some embodiments, the electromagnetic band gap structures may be etched into or mounted on and across a support plate (e.g., mid-support plate) to create a stopband for surface current flowing across (e.g., back-and-forth) on the support plate. Moreover, in some embodiments, the etched EBG structures may be tuned to reduce or minimize surface current flow or other noise occurring at a particular frequency.

For example, the shape of the EBG structures etched across the support plate may be tuned to avert the noise at particular frequencies. The EBG shapes may be characterized into two categories: narrowband and broadband EBG shapes. Narrowband EBG shapes may be described by their simple structure and may be easily manufactured or etched inside a plate. By way of example, a rectangular slot shape design may be considered a narrowband EBG. Broadband EBG shapes may include multi-edged shapes, such as a bow-tie shaped slot, which may be used to tune for a range of frequencies using the length of the multiple edges (e.g., bow edge length and bow height edge length).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 2 is a front view of a handheld device representing an example of the electronic device of FIG. 1, in accordance with an embodiment;

FIG. 3 is a front view of a handheld tablet device representing another example of the electronic device of FIG. 1, in accordance with an embodiment;

FIG. 10 is a diagram of multiple patterns of EBG structures etched into the modified mid-support plate, and a radio frequency absorber placed between the mid-support plate and display substrate, in accordance with an embodiment.

FIG. 11 is a diagram of modified EBG structures of FIG. 10 based on display features, in accordance with an embodiment.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

To improve wireless signal communication between wireless devices, as discussed above, embodiments presented herein describe EBG structures etched across (e.g., defected ground structures (DGS)) or mounted across a support plate (e.g., mid-support plate) to avert or stop the surface current flowing from an aggressor component (e.g., noise generating component) to prevent it from impacting victim components (e.g., component impacted by the aggressor). Additionally, depending on the frequency band used for the wireless communications, the shape of the EBG structure may be modified (e.g., narrowband shape or broadband shape) to prevent surface current interfering at a particular frequency band (e.g., narrowband frequencies, such as those in the range of 300-3400 hertz (Hz)) or a wide band of frequencies (e.g., broadband frequencies, such as those in the range of 50-7000 Hz). For example, if surface current is flowing from the aggressor to the victim when the device is communicating using Wi-Fi, such that the surface current is interfering with multiple wireless signals communicated on the 2.4 GHz and 5.0 GHz frequency bands, then the EBG structures may be tuned to avert the surface current at 2.4 GHz and 5.0 GHz frequency bands.

Figure 1:
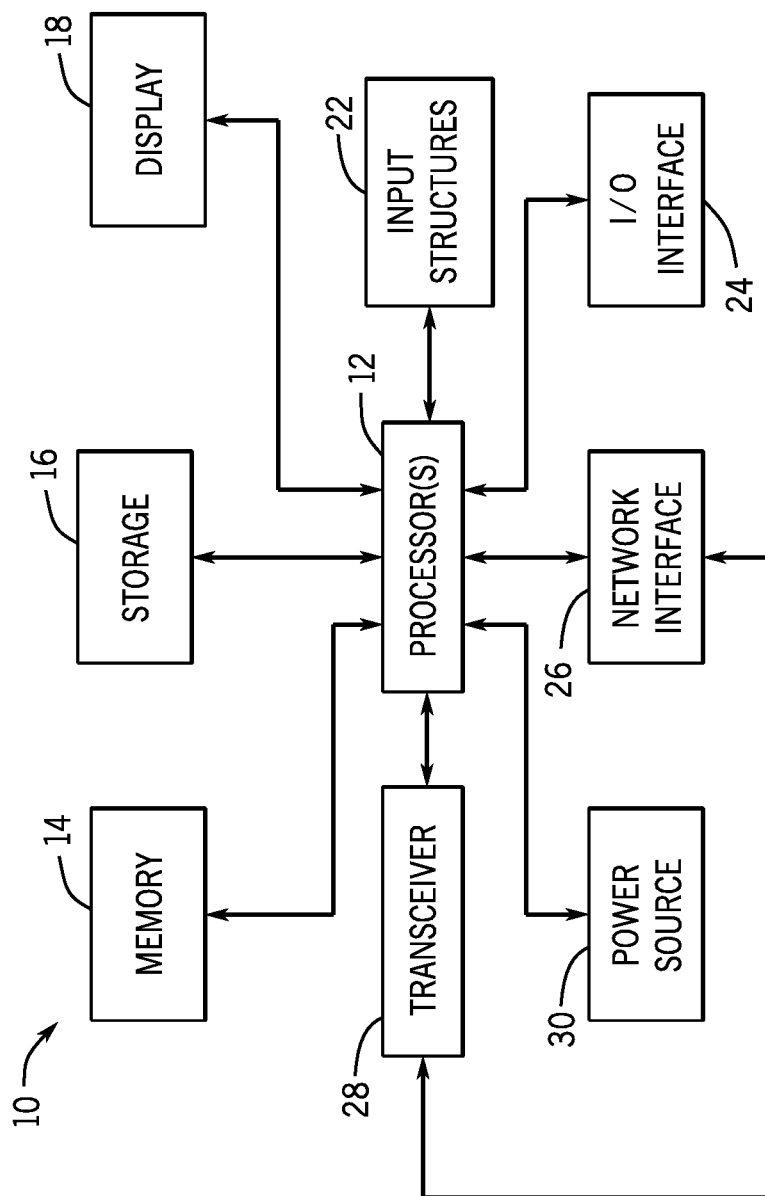
FIG. 1 is a block diagram of an electronic device with a display architecture that may include multiple display plates in parallel, in accordance with an embodiment.

With the foregoing in mind, a general description of a suitable electronic device that may utilize a display with an array of slots etched into its support plate will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a transceiver 28, and a power source 30. The various functional blocks shown in FIG. 1 may include hardware elements (including circuitry), software elements (including computer code stored on a tangible computer-readable medium) or a combination of both hardware and software elements. It should be noted that FIG. 1 is merely one example of a particular implementation and is intended to illustrate the types of components that may be present in the electronic device 10.

Figure 4:
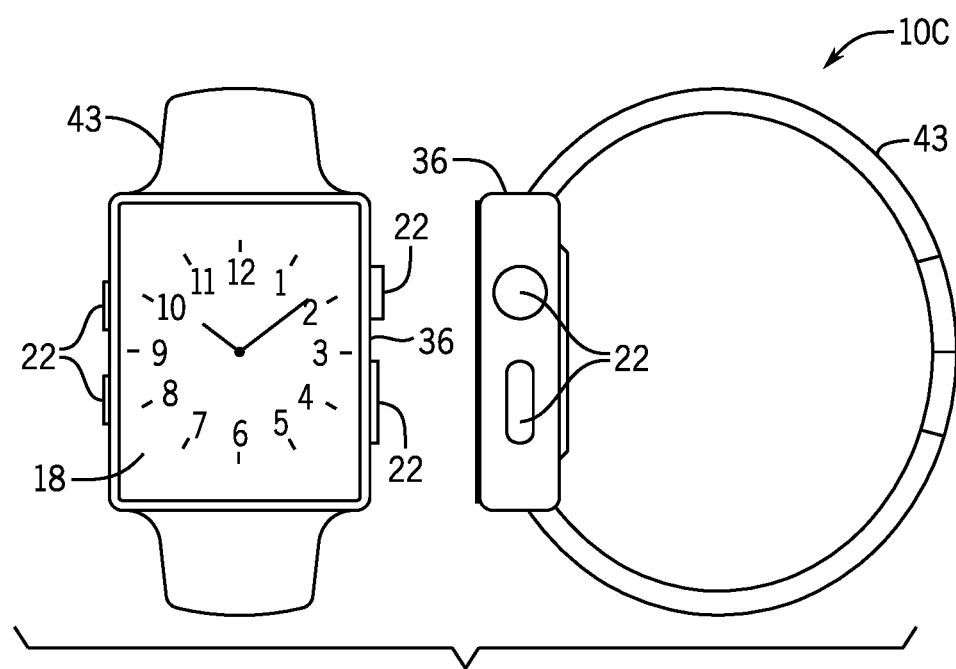
FIG. 4 is a front view and a side view of a wearable electronic device representing another example of the electronic device of FIG. 1, in accordance with an embodiment.

By way of example, the electronic device 10 may represent a block diagram of the handheld mobile device depicted in FIG. 2, the handheld tablet device depicted in FIG. 3, the wearable electronic device depicted in FIG. 4, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to facilitate the use of the processors(s) 12 to implement various stored algorithms. The algorithms may include algorithms to control one or more circuitry configurations (e.g., one or more antennas) to operate in different wireless communications, such as cellular, GPS, Wi-Fi, and the like. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, and long term evolution license assisted access (LTE-LAA) cellular network. The network interface 26 may also include one or more interfaces for, for example, broadband fixed wireless access networks (WiMAX), mobile broadband Wireless networks (mobile WiMAX), and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include a transceiver 28. The transceiver 28 may include any circuitry that may be useful in both wirelessly receiving and wirelessly transmitting signals (e.g., data signals). The transceiver 28 may include a transmitter and a receiver combined into a single unit. For example, the transceiver 28 may transmit and receive orthogonal frequency-division multiplexing (OFDM) signals (e.g., OFDM data symbols) to support data communication in wireless applications such as, but not limited to, PAN networks (e.g., Bluetooth), WLAN networks (e.g., 802.11x Wi-Fi), WAN networks (e.g., 3G, 4G, and LTE and LTE-LAA cellular networks), WiMAX networks, and mobile WiMAX networks.

As further illustrated, the electronic device 10 may include a power source 30. The power source 30 may include any suitable source of power, such as a rechargeable lithium polymer (Li-poly) battery and/or an alternating current (AC) power converter.

FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPhone® available from Apple Inc. of Cupertino, Calif. The handheld device 10A may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10A. For example, the input structures 22 may activate or deactivate the handheld device 10A, navigate user interface to a home screen, a user-configurable application screen, and/or activate a voice-recognition feature of the handheld device 10A. Other input structures 22 may provide volume control or may toggle between vibrate and ring modes. Some input structures 22 may include a microphone that may obtain a user's voice for various voice-related features and/or a speaker that may enable audio playback. The input structures 22 may also include a headphone input that may provide a connection to external speakers and/or headphones.

In certain embodiments, the electronic device 10 may take the form of a portable tablet electronic device, a wearable electronic device, or other type of electronic device. Such devices may include computers that are generally portable (such as laptop, notebook, and tablet computers). In certain embodiments, the electronic device 10 in the form of a computer may be a model of a MacBook®, MacBook® Pro, or MacBook Air® from Apple Inc.

By way of example, FIG. 3 depicts a front view of a handheld tablet device 10B, which represents another embodiment of the electronic device 10. The handheld tablet device 10B may represent, for example, a tablet computer, or one of various portable computing devices. By way of example, the handheld tablet device 10B may be a tablet-sized embodiment of the electronic device 10, which may be, for example, a model of an iPad® available from Apple Inc. of Cupertino, Calif. The handheld tablet device 10B may also include an enclosure 36 that holds the electronic display 18. Input structures 22 may include, for example, a hardware or virtual home button. The I/O interfaces 24 may also open through the enclosure 36 and may include an I/O port for a hardwired connection for charging and/or content manipulation.

Similarly, FIG. 4 depicts a wearable electronic device 10C representing another embodiment of the electronic device 10 of FIG. 1 that may be using the techniques described herein. By way of example, the wearable electronic device 10C, which may include a wristband 43, may be an Apple Watch® by Apple Inc. More generally, the wearable electronic device 10C may be any wearable electronic device such as, for example, a wearable exercise monitoring device (e.g., pedometer, accelerometer, heart rate monitor), or other device by another manufacturer. The wearable electronic device 10C may also include an enclosure 36 that holds the electronic display 18. The display 18 of the wearable electronic device 10C may include a touch screen display 18 (e.g., light emitting diode (LED), organic light emitting diode (OLED) display, active-matrix organic light emitting diode (AMOLED) display, liquid crystal display (LCD), and so forth), as well as input structures 22, which may allow users to interact with a user interface of the wearable electronic device 10C.

As previously noted above, each embodiment (e.g., handheld device 10A, handheld tablet device 10B, and wearable electronic device 10C) of the electronic device 10 may wirelessly communicate with other devices. The architecture of the display 18 of the electronic devices 10 may include multiple layers or plates in parallel, such as a display substrate on top of two or more display plates, such as a mid-support plate and a lower support plate (e.g., conductive display plates). The electronic device 10 may include EBG structures to mitigate surface current that may otherwise flow across the electronic device 10 due to the display plates arranged in parallel. In particular, the EBG structures may be on a support plate, such as the mid-support plate, to avert the surface current, thereby mitigating interference with wireless signals transmitted to or received by the electronic device 10.

As described herein, in certain implementations, the EBG structures etched into the support plate may create a barrier to mitigate or stop the surface current or noise from flowing across the device. In other implementations, the shape of the EBG structures may be adjusted to tune to a narrowband frequency or broadband frequency by using selected and appropriate EBG structures, such that surface current is averted for noise occurring on the tuned frequency or frequencies.

Although some of the following discussions relate to EBG structures on the mid-support plate, which represents a particular embodiment, it should be noted that the EBG structures may also implemented on the display substrate and/or the lower support plate. As previously discussed, surface current may flow from the "aggressor" to the "victim" of the electronic device 10 without the disclosed EBG structures on the mid-support plate.

In particular, without the disclosed EBG structures on the mid-support plate, the aggressor may include device components that impact the performance of other device components used for intended device operations, such as wireless communications. By way of example, the aggressor component may include, but is not limited to, display multiplexer and de-multiplexer circuits, diodes, chips, microprocessors, and the like. Without the disclosed EBG structures, the aggressor components may result in surface current flowing from it to other components of the device, the victim, which are used for the intended wireless signals. By way of example, the victim component may include one or more device antennas (e.g., Long-Term Evolution (LTE) antenna, GPS antenna, and/or Wi-Fi antenna), low noise amplifier (LNA), power amplifier (PA), etc. The unintended surface current may flow from the aggressor to the victim, thereby impacting the intended wireless communication signals, which may result in increased error rates and/or the electronic device 10 consuming additional power to transmit and/or receive the impacted wireless signals. Moreover, during some RF communications, the surface current may flow back-and-forth between the aggressor and the victim.

The mid-support plate without EBG structures may result in surface current that flows in both directions on the mid-support plate via the transmission line effect. Such surface current propagation may occur when the transmission line effect is created by the air gap between the metal plate of the display substrate that is formed by dense data lines and the mid-support plate. The surface current may propagate from the aggressor to the victim, and then back to the aggressor. In some embodiments, EBG structures may mitigate noise caused by the one or more aggressors. Additionally, the aggressor and/or the victim may change (e.g., to a different component) as the surface current flows in both directions.

By way of example, an electronic device 10 without the disclosed EBG structures and operation on a particular RF frequency, may result in noise at the particular RF frequency that causes interference with the receiver of the electronic device 10. The noise may travel back-and-forth between the transmitter and receiver components (e.g., the antenna). In particular, an antenna uplink power (e.g., aggressor) to adjust and uplink signal strength of RF signals transmitted from the antenna may couple to nonlinear display circuitry (e.g., multiplexer circuits) of the display substrate. Any noise from the transmitted RF signal may be modulated with baseband frequency from the display circuitry. As such, the modulated noise may fall into a downlink frequency range (e.g., lower range than the frequency band for transmitting RF signals). This downlink frequency range may include the frequency band or range used to receive signals by the receiver of the electronic device 10. The modulated noise may propagate in a bidirectional manner, traveling from the antenna during transmission and then coupling back to the antenna and interfering with received signals. The bidirectional modulated noise may cause desensitization of the receiver (e.g., victim).

To facilitate wireless transmissions while mitigating noise, in some embodiments, electromagnetic band gap (EBG) structures may be etched into or mounted on and across the support plate (e.g., mid-support plate) to create a stopband for surface current flowing across the support plate. Briefly, EBG structures are structures that may create a stopband to block electromagnetic waves of certain frequency bands by forming a pattern of small metal slots or holes on dielectric substrates. Moreover, EBG structures that are etched or cut into the mid-support plate may be referred to as defected ground structures (DGS) that defect a ground plane and disturb a transmission line. Thus, these structures may be used to suppress electromagnetic noise, such as the surface current or noise that may occur on the support plate and otherwise interfere with intended wireless signals. Moreover, the EBG or DGS structures may be formed such that they do not compromise the mechanical support provided by the mid-support plate.

As will be discussed in detail herein, the etched EBG structures may be tuned to minimize surface current flow or other noise occurring at a particular frequency or range of frequencies. For example, the EBG structures may be used to avert the surface current occurring at a particular frequency, thereby mitigating unwanted surface current flowing from one side of the device, such as the side with the noise causing component, to the other side, such as the side with the antenna used for transmitting or receiving RF signals. Although the following descriptions describe noise or surface current as propagating in a single direction, which represents a particular embodiment, the implementations of the modified mid-support plate 54A-L may be used to mitigate noise or surface current propagating in multiple directions (e.g., bidirectional propagation).

Figure 5:
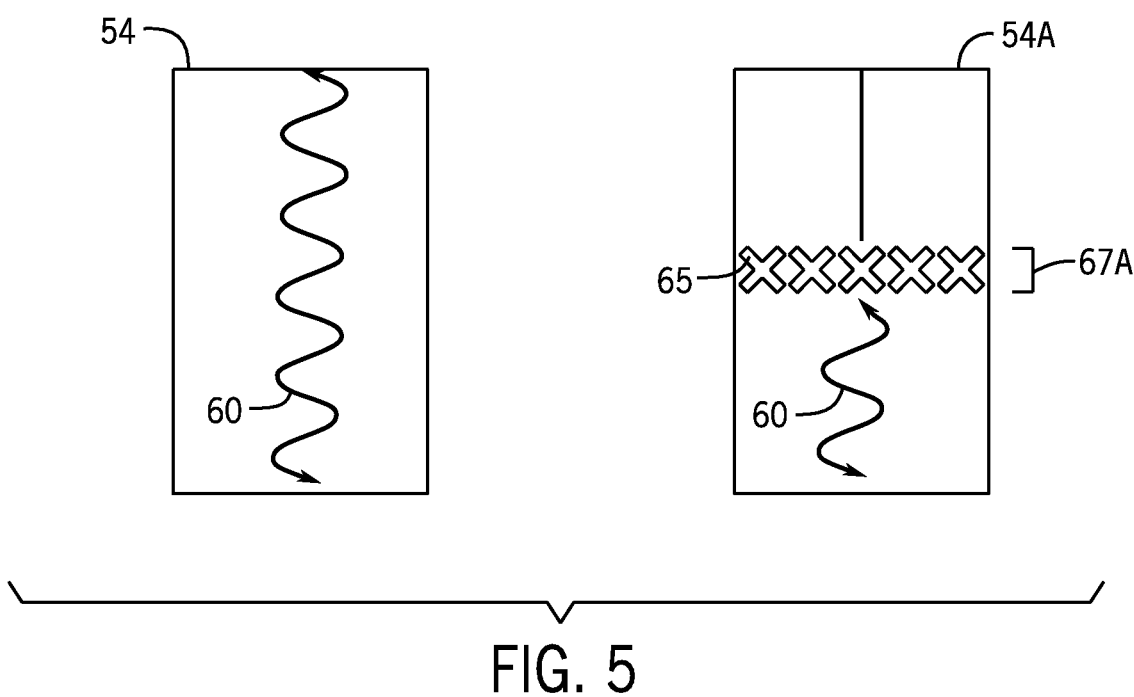
FIG. 5 is a diagram of EBG structures etched into and across a modified mid-support plate, in accordance with an embodiment.

To mitigate the noise caused by the surface current that may interfere with wireless communication signals, FIG. 5 depicts a modified mid-support plate 54A with an EBG barrier 67A of EBG structures 65 etched into the modified mid-support plate 54A to avert the electromagnetic field on the modified mid-support plate 54A, thereby mitigating, decreasing, or stopping propagation of the surface current 60. The EBG barrier 67A may include a pattern of repeating EBG structures 65, such that the number of EBG structures 65 included in the EBG barrier 67A may be based on and modified to completely extend across and up to the edges of the modified mid-support plate 54A. In this manner, the EBG structures 65 of the EBG barrier 67A may mitigate or decrease surface current 60 flow while upholding the structured characteristics of the modified mid-support plate 54A. Although not explicitly shown, and as previously discussed, the surface current 60 may originate from an aggressor component and may flow across the plate towards a victim component. As the surface current 60 flows from the aggressor to the victim, the EBG structures 65 that are across the modified mid-support plate 54A may mitigate or stop the surface current 60 from its presently flowing path, such that the surface current 60 may not significantly pass the EBG barrier 67A.

Figure 6:
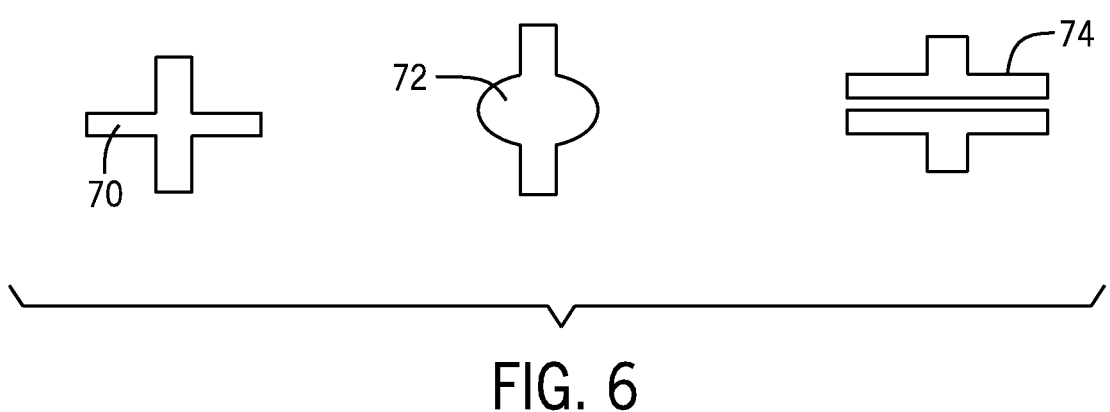
FIG. 6 is a diagram of narrowband and broadband shaped EBG structures used in the modified mid-support plate to avert noise occurring at particular frequencies, in accordance with an embodiment.

To further detail the EBG structures 65 that may be used in the pattern creating the EBG barrier 67A to avert the surface current 60 as described in FIG. 5, diagram of FIG. 6 illustrates narrowband and broadband EBG structures 65 that may be tuned to particular frequencies. Although the following description describes the EBG structures 65 as slots etched into the modified mid-support plate 54A, which represents a particular embodiment, the implementations of the modified mid-support plate 54A using EBG structures 65 may include, but are not limited to, planar EBG structures on the modified mid-support plate 54A, slotted EBG structures etched into the modified mid-support plate 54A, and/or 3D EBG structures mounted on top of the modified mid-support plate 54A. In general, narrowband EBG structures 65 may include one or more straight line-shaped slots without a curve or bend and may be used to tune for a narrowband. On the other hand, broadband EBG structures 65 may include one or more curved slots that may be used for tuning to broadband frequencies. Moreover, a combination of narrowband and broadband slots may be used for the EBG structures 65 to facilitate tuning for noise occurring on different frequencies.

Narrowband shapes of the EBG structures 65 may include, but are not limited to, a first narrowband EBG structure 70 and a second narrowband EBG structure 74. The one or more slots of the EBG structures 65 may each be tuned for a narrowband frequency. As shown, the first narrowband EBG structure 70 includes multiple slots in a cross-like or overlapping pattern. Similarly, the second narrowband EBG structure 74 includes multiple slots positioned in a parallel and/or perpendicular pattern. The pattern of slots may correspond to a particular narrowband frequency or range of narrowband frequencies.

However, if wireless applications utilize high data rates, such that broadband frequencies are used for the wireless communication, broadband EBG structures 65 may be used for tuning to broadband frequencies and stopping surface current 60 occurring on the tuned frequencies. By way of example, an electronic device 10 communicating high bandwidth signals on a range of frequencies (e.g., 2.4 GHz and 5.0 GHz used for Wi-Fi) may use broadband EBG shapes etched across and into the modified mid-support plate 54A to create a barrier. In comparison, if the electronic device 10 is communicating data signals on a narrowband, such as the 1.6 GHz used for global positioning system (GPS) communication, narrowband EBG shapes may be used.

In general, the broadband EBG structures 65 may be constructed with one or more tapered shaped slots. To illustrate, a broadband EBG structure 72 shows a round slot along with a rectangular slot. The round slot, and thus a broadband EBG structure 65, may be used to tune for noise occurring on a broadband frequencies. In both narrowband and broadband EBG structures 65, such as the first narrowband EBG structure 70, the second narrowband EBG structure 74, and the broadband EBG structure 72, surface current 60 flowing along the modified mid-support plate 54A is concentrated around the EBG structures 65 of the EBG barrier 67A, which prevent surface current 60 from further flowing across the aggressor to the victim on the modified mid-support plate 54A.

Figure 7:
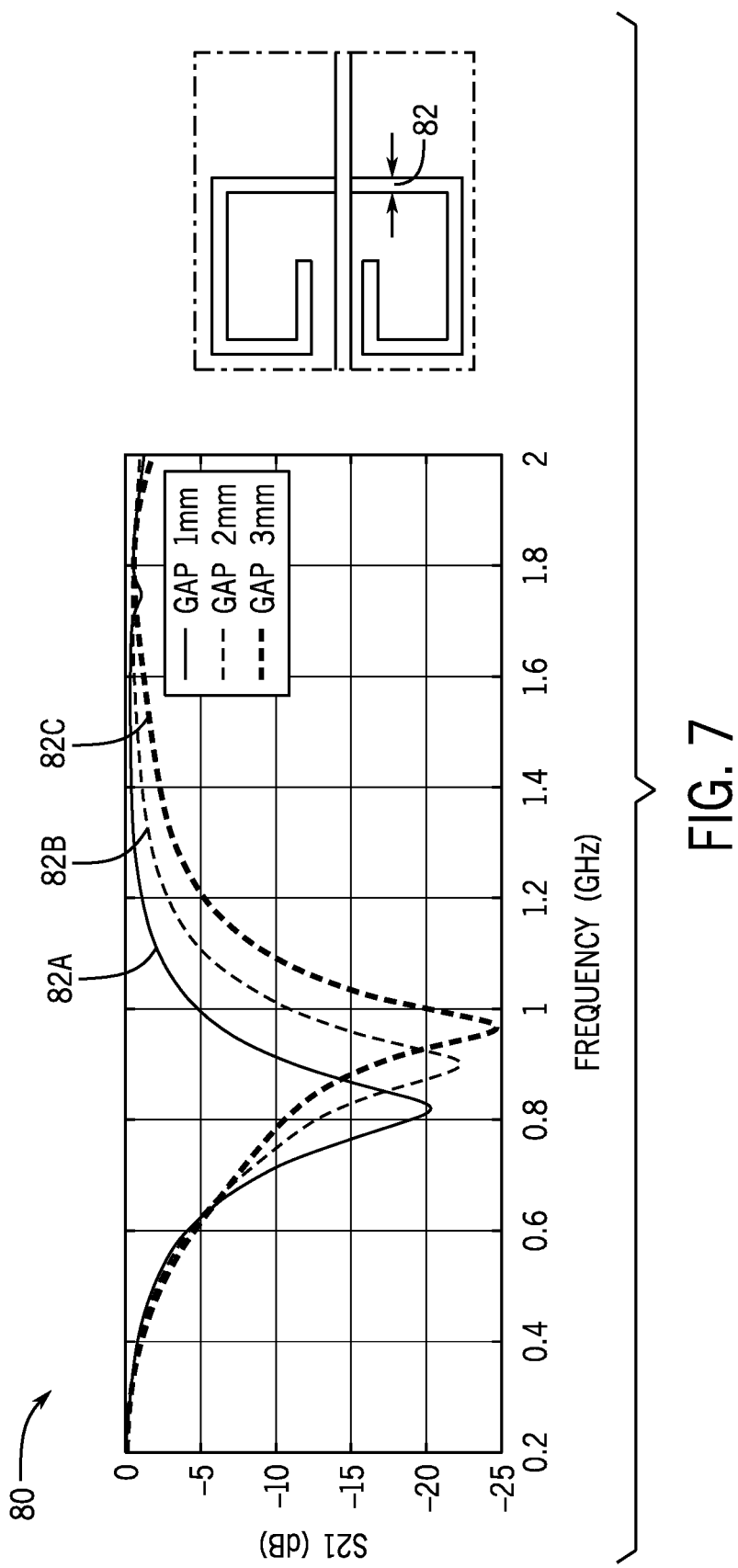
FIG. 7 is a graph diagram of scattering parameter (S-parameter) performance for varying gap widths of EBG structures, in accordance with an embodiment.

In addition to modifying the shape of the EBG structures 65, adjusting the gap (e.g., width) of the EBG structures 65 etched into the modified mid-support plate 54A may allow tuning to a particular range of frequencies. To illustrate, FIG. 7 depicts a graph 80 that indicates scattering parameter 21 (S-parameter $S_{21}$) (dB) performance for varying EBG structure gaps 82. As shown, a 1 millimeter (mm) gap 82A (indicated by a solid line), a 2 mm gap 82B (indicated by a dashed line), and a 3 mm gap 82C (indicated by a bold dashed line) may mitigate, decrease, or stop noise occurring at different frequencies (GHz). For example, the 3 mm gap 82C may be the most optimal size if targeting noise occurring between 0.8-1 GHz.

Figure 8:
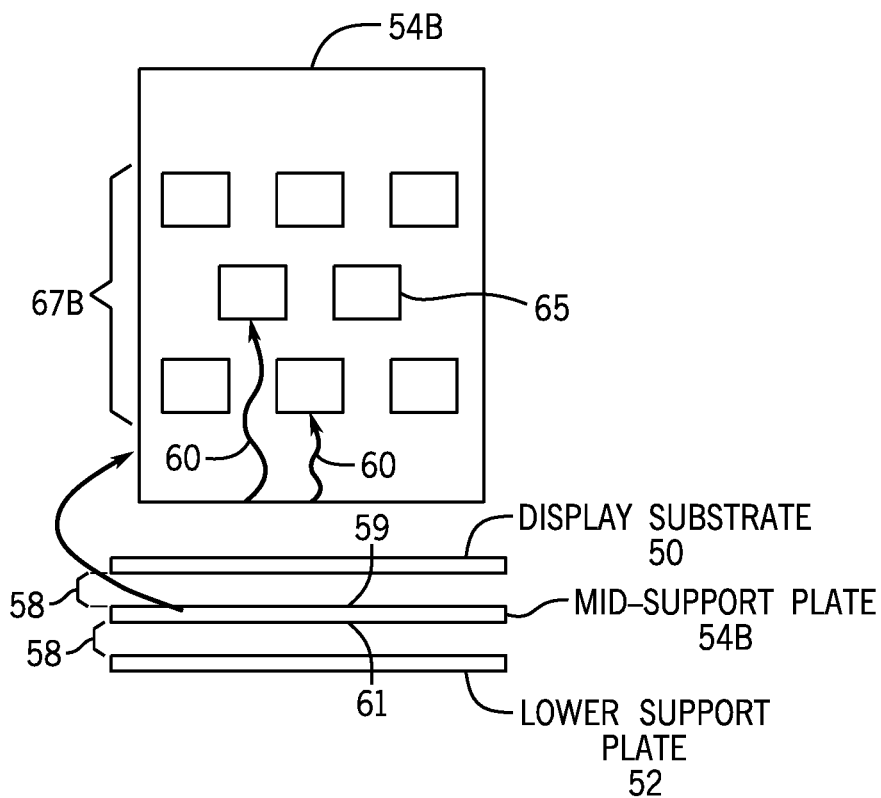
FIG. 8 is a diagram of a slotted EBG structure formed through the modified mid-support plate, in accordance with an embodiment.

To illustrate the implementation of the EBG structure 65 pattern on the modified mid-support plate 54A of FIG. 5, diagram of FIG. 8 illustrates an EBG slot pattern formed through and across the modified mid-support plate 54B. The modified mid-support plate 54B may include a first side 59 that is adjacent to a display substrate 50 and a second side 61 that is adjacent to a lower support plate 52. An air gap 58 may exist between the second side 61 and the lower support plate 52, such that surface current may flow across an electronic device 10 without EBG structures 65 on the modified mid-support plate 54B. As illustrated, the EBG structures 65 may be repeated across and in multiple rows (e.g., two or more rows) to create an EBG slot barrier 67B. In particular, the EBG structures 65 of the EBG slot barrier 67B may be etched completely through the modified mid-support plate 54B. Although the EBG structures 65 are repeated in a non-contiguous manner, such that the EBG structures 65 do not touch or share a common edge, which represents a particular embodiment, it should be noted that the methods described herein may be implemented using EBG structures positioned contiguously.

The rows may be offset from each other to prevent surface current 60 from flowing in between the slots. However, dielectric material may be used in the space created by the slots of the EBG slot barrier 67B. The offset rows of the slotted EBG structures 65 may maintain the stability and structure of the modified mid-support plate 54B. In some embodiments, dielectric material may also be used to maintain the stability of the display 18 structure. Thus, the structure of display 18 is functionally or structurally complete or operable while the EBG slot barrier 67B prevents electromagnetic interference caused by the surface current 60 that may otherwise flow across the modified mid-support plate 54B.

Figure 9:
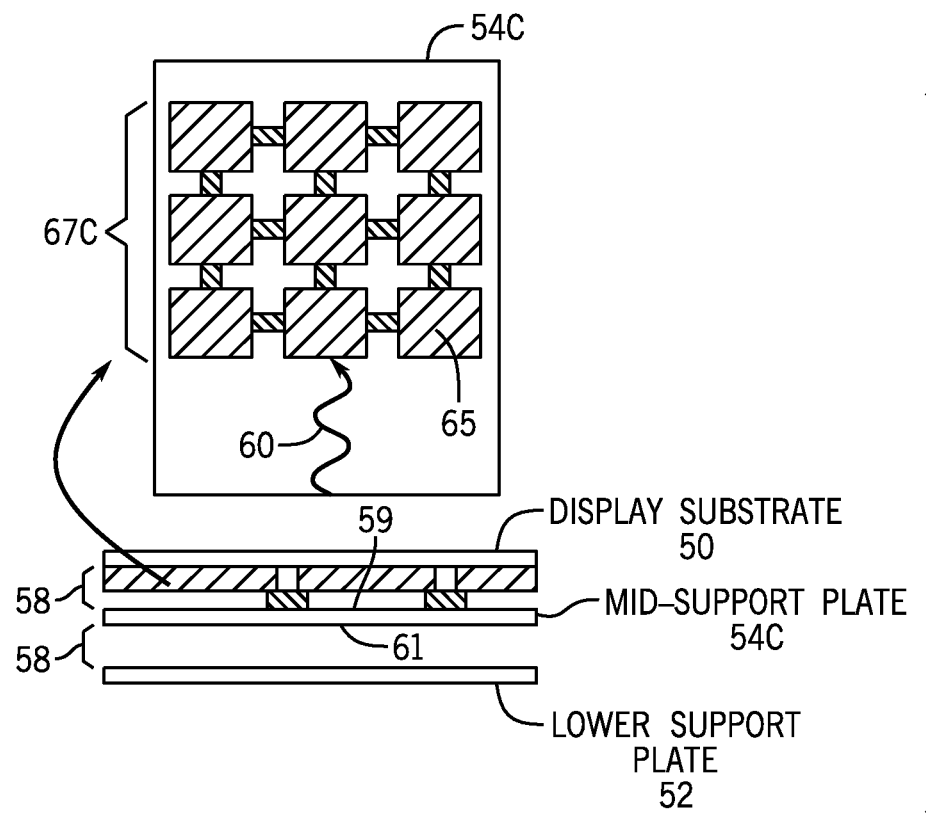
FIG. 9 is a diagram of a three dimensional EBG structure mounted onto the modified mid-support plate, in accordance with an embodiment.

Additionally or alternatively, block diagram of FIG. 9 illustrates an implementation of an EBG three dimensional (3D) barrier 67C across and on the modified mid-support plate 54C. The modified mid-support plate 54C may include a first side 59 that is adjacent to a display substrate 50 and a second side 61 that is adjacent to a lower support plate 52. An air gap 58 may exist between the second side 61 and the lower support plate 52, such that surface current may flow across an electronic device 10 without EBG structures 65 on the modified mid-support plate 54C. Similar to the EBG slot barrier 67B, and as illustrated, EBG structures 65 of the EBG 3D barrier 67C may be repeated across in one or more rows. In particular, the EBG structures 65 may be mounted onto the modified mid-support plate 54C, such that the mounted EBG structures 65 interrupt the transmission line effect created by the air gap 58 of the display 18 architecture. In this manner, the air gap 58 is minimized and no longer continuous, and thus, surface current 60 flowing through the air gap 58 may be mitigated or stopped.

Moreover, the 3D nature of the EBG 3D barrier 67C provides additional stability to the display 18 architecture. However, additionally or alternatively, dielectric material may be used in any remaining spaces created by the 3D EBG barrier 67C to further maintain the stability of the display 18. Thus, the various EBG structure implementations on a support plate 54, such as the EBG slot barrier 67B or the EBG 3D barrier 67C, on the respective modified mid-support plate 54B and 54C, may be used to mitigate or stop surface current 60 from interfering with wireless communications on device 10.

In some implementations, the EBG structures 65 that are etched through may vary in shape and size in order to mitigate noise at multiple frequencies or range of frequencies and/or to accommodate specific display 18 characteristics. As shown in FIG. 10, multiple patterns of EBG structures 65 are formed through and across the modified mid-support plate 54D. Moreover, an RF absorber 66 may be used in addition to or in place of the multiple EBG structures 65. The RF absorber 66 may include lossy material that attenuates the energy or surface current 60 flowing across and/or in both directions on the mid-support plate 54D. The lossy material may be sheet form and may be strategically placed directly over circuitry without shorting the circuits. Thus, the RF absorber 66 may be placed directly over the display circuitry and data lines of the display substrate 50 (not shown), and between the display substrate 50 and modified mid-support plate 54D. Moreover, the RF absorber 66 may be positioned in the middle of the modified mid-support plate 54D to absorb the surface current 60 traveling on the mid-support plate 54, preventing it from reaching victim components.

Additionally or alternatively, the EBG structures 65 may be repeated across and in multiple rows to create an EBG slot barrier 67D. In addition to the narrowband and broadband EBG shapes previously discussed, the EBG structures 65 may be rectangular, straight line, hairpin shaped, U-shaped, C-shaped, L-shaped, and/or combined shapes. For example, the multiple straight line EBG structures 65 of the EBG slot barrier 67D may be used for tuning to broadband frequencies while a U-shaped EBG structure 65 of a second EBG slot barrier 68A is used for tuning to narrowband frequencies. As such, various EBG shapes may be etched on the modified mid-support plate 54D depending on targeted frequencies for tuning.

In addition to mitigating noise occurring at particular frequencies, the EBG shape, size, and/or etching location may be selected based on design constraints, such as mechanical support constraints and wireless communication constraints related to the antenna. For example, the EBG structures 65 may be placed to avoid the antenna return path when the surface current 60 travels to and from the antenna in a bidirectional manner. If the EBG structures are placed on the antenna return path, then the antenna energy (e.g., from the antenna uplink power) would leak into the display substrate 50 and couple to components of the display circuitry.

In some implementations, the electronic device 10 and/or display 18 mechanical characteristics may prevent etching at an optimal location on the modified mid-support plate 54D. For example, the EBG structures 65 may be etched into and across the width 63 (e.g., 85% of the width, 90% of the width, 95% of the width, and so forth) of the modified mid-support plate 54D up until the modified mid-support plate 54D no longer provides structural support. It should be appreciated that although some of the following discussions relate to etching EBG structures 65 while maintaining the mechanical structure of an electronic device 10 or display 18, which represents a particular embodiment, the methods and systems may also be performed and implemented without considering the mechanical support for the electronic device 10 or display 18. For example, the EBG structures 65 may be etched into and all the way across the modified mid-support plate 54 to optimally mitigate noise.

To illustrate, FIG. 11 depicts a modified mid-support plate 54E with EBG etching locations that consider electronic device 10 and/or display 18 design features. As shown, the modified mid-support plate 54 may include one or more display flexes 81 that provide physical flexibility (e.g., bending within a predetermined range) to the mid-support plate 54 and/or support regions 83 (e.g., design slot) to accommodate circuitry and components on the lower support plate 52 (not shown). Moreover, the mid-support plate 54 may also be designed to accommodate components used for modulation. As previously discussed, the uplink power for an RF signal may generate noise, which may occur at the same RF frequency band for transmitting the RF signal. The multiplexer of the multiplexer and de-multiplexer circuitry 84 may modulate the noise with baseband frequency of the display circuitry. This modulation may result in the noise occurring at a different frequency band, such as the frequency band used to receive RF signals. Since the modified mid-support plate 54E is designed to support these features, the EBG structure 65 may be strategically etched in locations that consider these design features along with the goal to mitigate noise, such as the modulated noise affecting the receiver.

Figure 12:
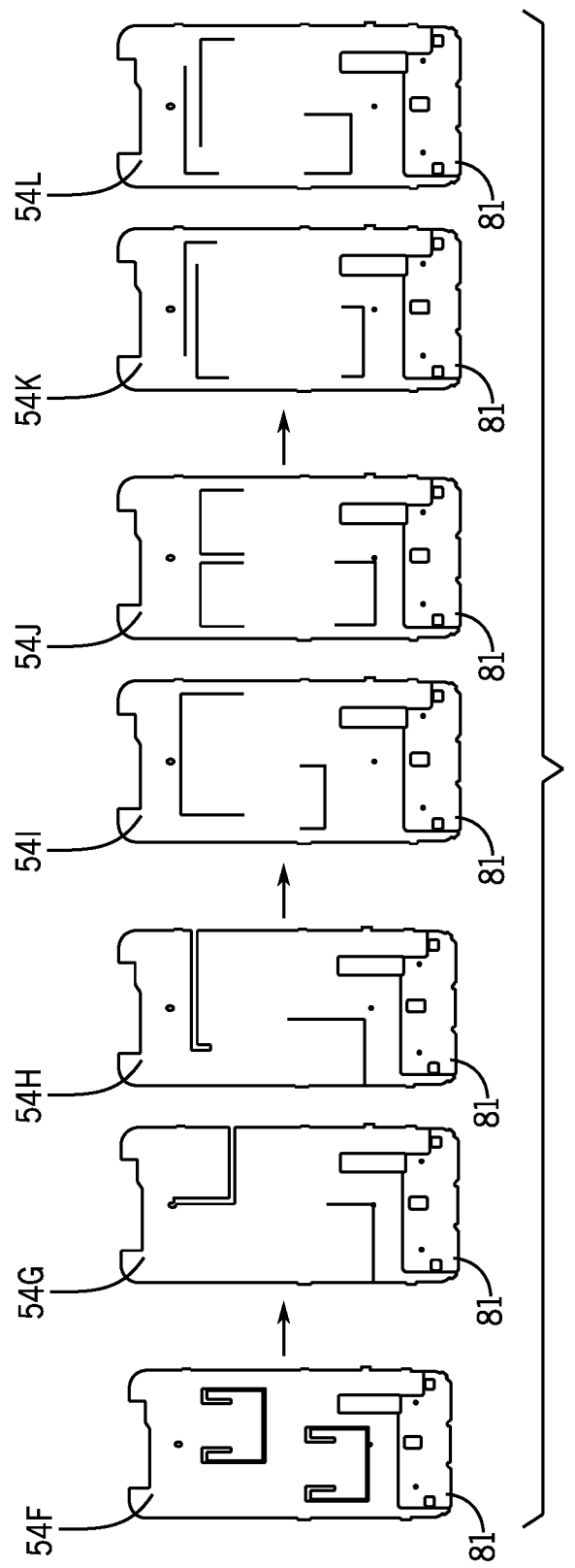
FIG. 12 is a diagram of multiple versions of the modified EBG structures of FIG. 11, in accordance with an embodiment.

As shown, the EBG slot barrier 67E may be etched at the same location as the EBG slot barrier 67D of FIG. 10 since the display flex 81 does not overlap with the EBG slot barrier 67E location. However, the EBG structure 65 of the second EBG slot barrier 68B is smaller to accommodate the adjacent support region 83. As such, depending on the design of the electronic device 10 and/or display 18, the etching location and/or EBG structure 65 shape, size, frequency (e.g., multiple rows), and gap 82 (FIG. 7) may be adjusted. Moreover, the number of EBG structures 65 of the EBG slot barrier 67E and the spacing between them may be based on structural support for the display 18. To further illustrate design considerations when selecting EBG structures 65 for etching, the modified mid-support plates 54F-L of FIG. 12 depict different embodiments of the modified mid-support plate 54 that are designed to support the stability and mechanical structure of the display 18 while preventing noise that may otherwise flow across the modified mid-support plate 54.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A support plate of a display device, comprising:
a first side disposed adjacent to a display substrate of the display device, the first side comprising a plurality of electromagnetic band gap structures disposed within the support plate, each of the plurality of electromagnetic band gap structures comprising a respective width configured to reduce a surface current flow having a frequency; and
a second side configured to be disposed adjacent to a conductive plate, the support plate physically separate from the conductive plate.

2. The support plate of claim 1, wherein the plurality of electromagnetic band gap structures comprises one or more straight line-shaped electromagnetic band gap structures configured to reduce the surface current flow on the display substrate occurring at narrowband frequencies.

3. The support plate of claim 2, wherein the one or more straight line-shaped electromagnetic band gap structures are disposed in a cross pattern, an overlapping pattern, or both.

4. The support plate of claim 2, wherein the one or more straight line-shaped electromagnetic band gap structures are disposed in parallel or perpendicularly.

5. The support plate of claim 2, wherein the narrowband frequencies are associated with global positioning system (GPS) communications.

6. The support plate of claim 1, wherein the plurality of electromagnetic band gap structures comprises one or more curve-shaped electromagnetic band gap structure configured to reduce the surface current flow on the display substrate occurring at broadband frequencies.

7. The support plate of claim 6, wherein the broadband frequencies comprise frequencies between 2.4 gigahertz (GHz) and 5.0 GHz.

8. The support plate of claim 1, wherein the plurality of electromagnetic band gap structures comprise dielectric material.

9. A support structure of a display device, comprising:
a first support plate comprising
a first side configured to be disposed adjacent to a display layer of the display device,
a plurality of electromagnetic band gap structures each having a respective width configured to reduce a surface current flow having a frequency, and
a second side, and
a second support plate configured to be disposed adjacent to the second side of the first support plate, the second support plate physically separate from the first support plate.

10. The support structure of claim 9, wherein the respective width of each of the plurality of electromagnetic band gap structures is between 1 millimeter and 3 millimeters.

11. The support structure of claim 9, wherein a first electromagnetic band gap structure of the plurality of electromagnetic band gap structures has a first width and a second electromagnetic band gap structure of the plurality of electromagnetic band gap structures has a second width different than the first width, the first electromagnetic band gap structure and the second electromagnetic band gap structure configured to reduce the surface current flow at different frequencies based on the first width and the second width.

12. The support structure of claim 9, wherein the plurality of electromagnetic band gap structures comprises one or more straight-line shaped electromagnetic band gap structures disposed within the first support plate and configured to reduce the surface current flow on the display device occurring at narrowband frequencies.

13. The support structure of claim 12, wherein the narrowband frequencies comprise 300 hertz to 3.4 kilohertz.

14. The support structure of claim 9, wherein the plurality of electromagnetic band gap structures comprise dielectric material.

15. The support structure of claim 9, wherein the plurality of electromagnetic band gap structures comprises one or more curve-shaped electromagnetic band gap structures disposed within the first support plate and configured to reduce the surface current flow on the display device occurring at broadband frequencies.

16. The support structure of claim 15, wherein the broadband frequencies comprises frequencies between 2.4 gigahertz (GHz) and 5.0 GHz.

17. A display, comprising:
a display substrate; and
a support plate disposed adjacent to the display substrate, the support plate comprising a plurality of electromagnetic band gap structures disposed within the support plate, each of the plurality of electromagnetic band gap structures comprising a respective width configured to reduce a surface current flow having a frequency.

18. The display of claim 17, wherein the support plate is a mid-support plate and the display comprises a lower support plate disposed adjacent to the mid-support plate, the lower support plate physically separate from the mid-support plate.

19. The display of claim 17, wherein the plurality of electromagnetic band gap structures comprises one or more multiple edged electromagnetic band gap structures, the one or more multiple edged electromagnetic band gap structures comprising different edge lengths and different edge heights.

20. The display of claim 19, wherein the one or more multiple edged electromagnetic band gap structures are configured to reduce the surface current flow occurring at a first range of broadband frequencies using the different edge lengths and reduce the surface current flow occurring at a second range of broadband frequencies using the different edge heights.

* * * * *